Dec. 28, 1948.    R. L. HINDS    2,457,675
ELECTRODE CONTROL
Filed Aug. 25, 1945

Inventor
Robt. L. Hinds
By Geo E Kirk
Attorney

Patented Dec. 28, 1948

2,457,675

UNITED STATES PATENT OFFICE 2,457,675

ELECTRODE CONTROL

Robert L. Hinds, Toledo, Ohio

Application August 25, 1945, Serial No. 612,674

2 Claims. (Cl. 219—26)

This invention relates to features of adaptability and performance-maintenance in electrodes, more particularly for hand tools.

This invention has utility when incorporated in connection with welding and soldering apparatus, especially in the directing or handle control for locating and shifting a work-heating electrode as to the work being acted upon, as for quick and accurate soldering, even in locations of small clearance and where not readily accessible.

Referring to the drawings.

Figure 1:
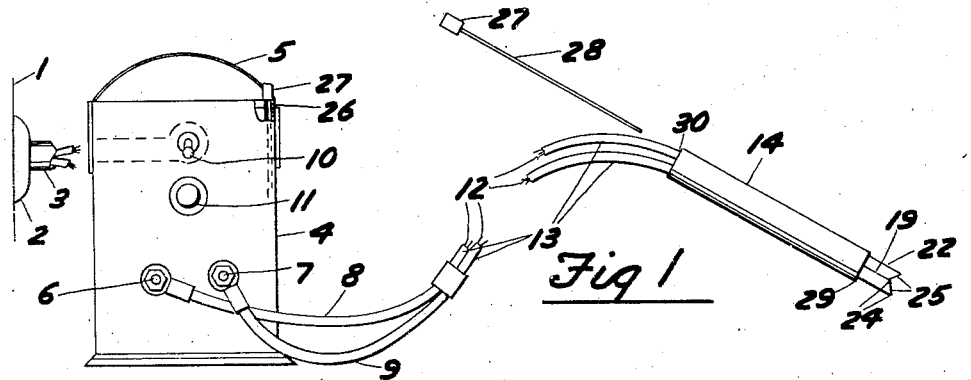
Fig. 1 is a view of an embodiment of the invention in a two-electrode directing handle, in association with a step-down voltage transformer therefor.
Figure 2:
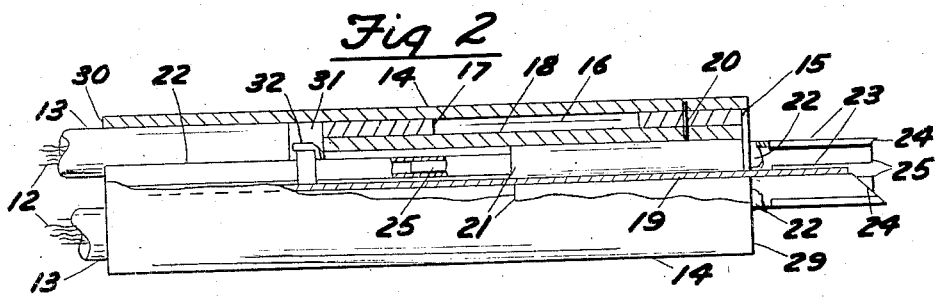
Fig. 2 is a side elevation, with parts broken away, of the two-electrode grip or directing handle of Fig. 1.
Figures 3, 4:
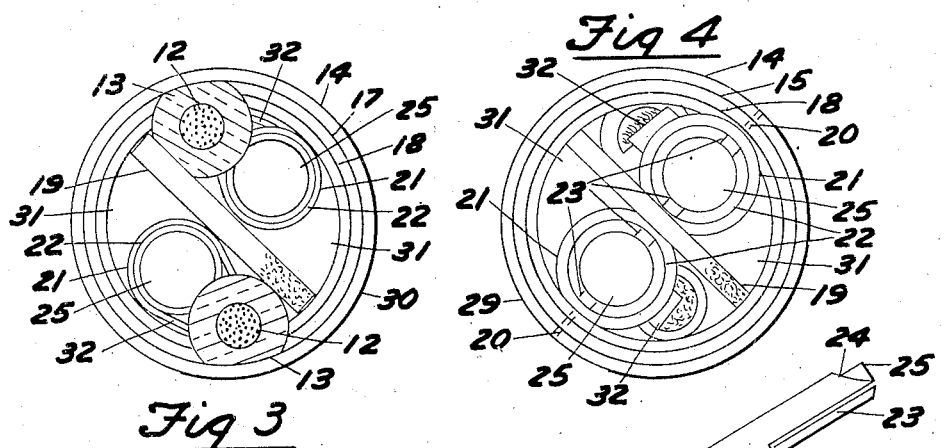
Fig. 3 is an enlarged view from the left of the grip of Fig. 2.
Fig. 4 is an enlarged view from the right or electrode protruding end of the grip of Fig. 2.

At a wall fixture 1, a fitting 2 may be thrust into position for conducting, thru a conduit 3, normal line voltage to a housing 4 in which is located a step-down transformer. A strap handle 5 extends across over the housing 4. At terminals 6, 7, higher amperage take-off leads or lines 8, 9, may be connected. Throwing in of a toggle switch 10 cuts the transformer in for supply of electric current to the leads 8, 9. A light 11 is located on the housing 4 between the switch 10 and the terminals 6, 7.

The respective leads 8, 9, have a stranded conductor wire core 12 enveloped by insulation 13 for carrying the high amperage and low voltage electric current. An instance of the practice is to take on line current from the fixture 1, of say 110 volt 60 cycle alternating electric current, which at a normal load of 13½ amperes is stepped down in voltage to the range of 3½ volts, with the amperage available up to 800 amperes as 100% overload is approached.

A grip is provided having an outer fiber insulation cylinder 14. At the remote end from the transformer housing 4, the grip handle outer shell or tube 14 has flush therewith a short tube section 15 back of which is an air chamber region 16 to a second tube section 17 medially in the grip 14. These two sections 15, 17, have press fitted therein a fiber tube 18. Diametrically in the tubular way thru this plural ply handle is a glass fiber insulation partition 19. Spaced slightly back from the flush end of the handle tubular sections 14, 15, 18, radial pins 20 are embedded on a diameter approximately at right angles to the partition 19. The inner ends of these pins 20 sufficiently engage metallic guide tubes 21, which may be of brass, to have the ends of the tubes 15, 18 register flush with the grip handle end of tube 14.

Frictionally held or by solder in each of these guide tubes 21 is an electrical conductor or electrode sleeve or holder 22 extending generally thruout the length of the handle or grip and therebeyond to have longitudinal slots 23 from a slant cut-off or tapered end 24. The diametrical slots 23 from the end 24 provide a yielding wall end section for the holder 22. This yielding section is desirably given an initial spring set at a slight collapse, thereby to provide a normal less diameter tubular clearance for a carbon pencil or cylindrical electrode rod 25.

From a port 26 in a top corner of the box or housing 4, a knob 27, as protruding, has a stem or plunger 28. Remote from the electrode protruding end 29 of the grip 14, the handle rear end 30 is open to the open rear ends of the sleeves or tubes 22. By directing the plunger 28 into a tube 22 it lodges against the after end of a carbon 25. Thrusting thereon, squeezes the electrode carbon 25 into the spring seat or gripping portion 23, 24.

In the two-electrode assembly, the fiber glass spacer 19 is ample insulation to avoid shorting thereacross, even with the electrodes 25 in close proximity. Furthermore, the character of the fiber glass material is such that molten metal or fused solder has not a tendency to adhere or cling thereto. Therefrom it follows that any spitting, sputtering or slopping of molten material at a welding, brazing or soldering operation, at all times leaves the working regions of the exposed tool electrodes clean. The slant cut-back 24, is such that at all times there may be an exposed side portion or corner of the carbon 25. The fragile or easily fractured carbon is not exposed for breaking hazard. In fact, the hand tool may be dropped, or even flung down, with no rupture of the carbon working end or point. The plunger 28 is conveniently located to the operator so that as the carbon flakes off in use, on a different point relation be desired, the thrusting nicely and quickly brings the desired result, and the auxiliary plunger tool 28 may be replaced in the housing 4 for reuse, as further occasion requires.

Handle chamber portion 31 inward from the end 30, has therein a short strap, ring or sleeve portion terminal 32 for silver solder or other anchoring with a sleeve 22 and wraps back of stranded wire 12 in the positive assembly of a lead thereto. Low internal resistance conductor course is thus provided for the high amperage from the transformer in the housing 4, not only to the handle or grip 14, but therethru to the carbon pinching or squeezing seat portion 23, 24.

In practice the proportion of the connections thru the handle or grip 14 from the conductor lead wires 12 are ample to hold down, if not fully eliminate heating or transmission loss from the transformer to the work to such extent that the insulation 13 and the grip 14 do not evidence temperature rise sufficient to be uncomfortable to the operator. A factor to hold down the heat at the grip 14, even as might be conducted back from the work, is the dead air space or chamber 16, as well as the open space regions 31 along opposite sides of the partition 19.

With the electrodes 25 of $\frac{5}{32}''$ diameter the current demand may be run up to 200 amperes. Working speed is of importance, especially on small or delicate work, as in signalling equipment, such as radio, radar, telephone, and like apparatus, as well as for household and other small motors, and requirements for connections, whether or not such be electrical of lead-zinc solder, silver solder, or even brazing or welding. Timing for lead-zinc solder on rather small electrical connections has been checked as .038 second.

Figure 5:
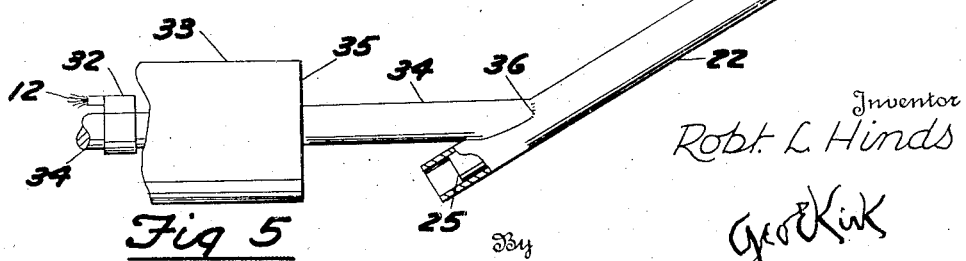
Fig. 5 is a fragmentary detail view of an electrode having an offset or angular direction from the handle.

There may be, on occasion, purpose for extending the electrode some distance from a grip 33. In which instance, instead of a holder sleeve or tube 22 in the handle, a rod 34 has the lead connection 32 thereto (Fig. 5). The rod 34 as protruding from end 35 of the grip 33, may, at an appropriate or selected angle have brazed or silver-solder connection 36 to the electrode holder sleeve 22.

The low transmission resistance thru the grips 14, 33, is a factor of electric power consumption economy. For the heat operation upon the work being undertaken, the resistance is producing practically all of its heat right in the carbon electrode from its pinch seat contact region 23 of the holder sleeve 22. There is slight hazard from the low voltage. The high amperage has but a short heat resistance distance to travel in the electrodes and the short bridging distance of the work therebetween.

Importance follows for practical ranges of control with a retained simplified construction. With a layout for the secondary or working circuit in the range of 3.19 volts, the practice herein with but 3.1 volts evidences the low internal resistance of the circuit as taking the high amperage load. The voltage drop for the work is, under the operation herein, held to a constant, or close thereto, even with a wide range of amperes passing.

The pinching of the electrode 25 at the region 23, 24, of the sleeve or tube 22, localizes the resistance to the electrode 25 as exposed, and say the solder of the work to be fused, with its low resistance bridging between the carbons. With the carbon 25 flush with the longer side of the tube 22, so that there be but the slant carbon exposure, spaced by the thin fiber glass partition 19, experience herein has been not to have sputtering or flashing, when in the range of 3 volts, fusing of the solder is had.

The character of the carbon 25 is a factor. $\frac{5}{32}''$ diameter carbon, termed in the trade as hard, at flush on 15 seconds timing is automatic control for 7 a. Outward thrusting $\frac{1}{8}''$ and the current control is 6 a.; $\frac{1}{4}''$ 5 a., and in all this no voltage drop from 3 volts. For trade designated soft carbon $\frac{5}{32}''$ dia., adjustments showing flush 22 amperes, protruding $\frac{1}{8}''$ 21 a., protruding $\frac{1}{4}''$ 19¼ a. Here, as with the hard carbon, there was no voltage drop from 3 volts. With soft carbon and larger diameter, amperage is built up, as for $\frac{3}{8}''$ diameter soft carbon, different adjustments show protruding ½'' 290 a., 2'' 170 a.

Total elimination of sparking or flashing, is with absence of actinic and ultra violet rays, with the energy in the heat ray range for efficient operation.

The low voltage allows compact assembly, even for a two-electrode holder. Herein a holder with its electrodes assembled for working, has a weight of 8 oz. For comparable range of work, higher voltage requirements with amperage control not as herein at the work, the mass of such other tool calls for 24 oz. and up. This means for applicants a tool less operator fatigue and resultant increased output.

What is claimed and it is desired to secure by Letters Patent is:

1. An electrode directing holder comprising a tubular insulation portion, a partition therein, conductor leads into the holder at opposite sides of the partition, an open ended electrode mounting conductor sleeve on each side of the partition connected to a lead and extending from the insulation portion beyond the partition and there having its end tapered back toward the partition, the two sleeve ends thus having their tapered ends diverging to form a V open in extent away from the tubular insulation partition, and an electrode in each sleeve and protruding into the V.

2. An electrode directing holder comprising a cylindrical tubular insulation portion, a fiber glass diametrical partition protruding therefrom, conductor leads into the holder at opposite sides of the partition, an open ended electrode mounting conductor sleeve on each side of the partition and extending from the tubular insulation portion beyond the protruding partition and there having its end tapered back toward the partition, the two sleeve ends thus having their tapered ends diverging to form a V open in extent away from the tubular insulation portion, and an electrode in each sleeve and protruding into the V to be there spaced by the partition.

ROBT. L. HINDS.

REFERENCES CITED

The following references are of record in the file of this patent:

UNITED STATES PATENTS

| Number | Name | Date |
| --- | --- | --- |
| 1,690,101 | Burns | Nov. 6, 1928 |
| 1,862,653 | Bean | June 14, 1932 |
| 1,869,328 | Tobey | July 26, 1932 |
| 1,869,448 | Woodring | Aug. 2, 1932 |
| 2,162,615 | Harlan | June 13, 1939 |
| 2,180,665 | Bruggerman | Nov. 21, 1939 |
| 2,422,265 | Squires | June 17, 1947 |